United States Patent
Anschuetz et al.

(10) Patent No.: US 10,351,221 B1
(45) Date of Patent: Jul. 16, 2019

(54) METHODS FOR AUTOMATICALLY CONTROLLING ATTITUDE OF A MARINE VESSEL DURING LAUNCH

(71) Applicant: Brunswick Corporation, Lake Forest, IL (US)

(72) Inventors: Steven M. Anschuetz, Fond du Lac, WI (US); Steven J. Andrasko, Oshkosh, WI (US); Andrew J. Przybyl, Berlin, WI (US)

(73) Assignee: Brunswick Corporation, Mettawa, IL (US)

( * ) Notice: Subject to any disclaimer, the term of this patent is extended or adjusted under 35 U.S.C. 154(b) by 182 days.

(21) Appl. No.: 15/693,713

(22) Filed: Sep. 1, 2017

(51) Int. Cl.
| G05D 1/08 | (2006.01) |
| B63H 20/10 | (2006.01) |
| B63H 20/20 | (2006.01) |

(52) U.S. Cl.
CPC .......... *B63H 20/10* (2013.01); *G05D 1/0875* (2013.01); *B63B 2759/00* (2013.01); *B63H 20/20* (2013.01)

(58) Field of Classification Search
None
See application file for complete search history.

(56) References Cited

U.S. PATENT DOCUMENTS

| 3,682,127 A | 8/1972 | Waquet |
| 3,777,694 A | 12/1973 | Best |
| 3,999,502 A | 12/1976 | Mayer |
| 4,050,359 A | 9/1977 | Mayer |
| 4,318,699 A | 3/1982 | Wenstadt et al. |
| 4,413,215 A | 11/1983 | Cavil et al. |
| 4,490,120 A | 12/1984 | Hundertmark |
| 4,565,528 A | 1/1986 | Nakase |

(Continued)

FOREIGN PATENT DOCUMENTS

EP 2368791 B1 1/2013

OTHER PUBLICATIONS

Andrasko et al., "Systems and Methods for Automatically Controlling Attitude of a Marine Vessel with Trim Devices," Unpublished U.S. Appl. No. 14/873,803, filed Oct. 2, 2015.

(Continued)

*Primary Examiner* — Christian Chace
*Assistant Examiner* — Katherine Marie Fitzharris
(74) *Attorney, Agent, or Firm* — Andrus Intellectual Property Law, LLP

(57) ABSTRACT

A method for controlling a trim position of a marine propulsion device includes receiving operator demands corresponding to propulsion system operating speeds and determining a rate of change of demand versus time between an initial and a subsequent operator demand. When the rate of change of demand exceeds a predetermined rate, the control module uses successively measured operating speeds of the propulsion system and an offset trim profile to determine setpoint trim positions for the propulsion device. As the propulsion system's measured operating speed increases from an initial to a subsequent operating speed, the control module controls a trim actuator to rotate the propulsion device to the setpoint trim positions. An operating speed at which the propulsion device begins trimming up is less according to the offset trim profile than according to a base trim profile, which is utilized when the rate of change does not exceed the predetermined rate.

20 Claims, 7 Drawing Sheets

(56) References Cited

U.S. PATENT DOCUMENTS

| | | | |
|---|---|---|---|
| 4,718,872 A | 1/1988 | Olson et al. |
| 4,749,926 A | 6/1988 | Ontolchik |
| 4,776,818 A | 10/1988 | Cahoon et al. |
| 4,824,407 A | 4/1989 | Torigai et al. |
| 4,836,810 A | 6/1989 | Entringer |
| 4,861,292 A | 8/1989 | Griffiths et al. |
| 4,872,857 A | 10/1989 | Newman et al. |
| 4,898,563 A | 2/1990 | Torigai et al. |
| 4,908,766 A | 3/1990 | Takeuchi |
| 4,931,025 A | 6/1990 | Torigai et al. |
| 4,939,660 A | 7/1990 | Newman et al. |
| 4,940,434 A | 7/1990 | Kiesling |
| 4,957,457 A | 9/1990 | Probst et al. |
| 5,113,780 A | 5/1992 | Bennett et al. |
| 5,118,315 A | 6/1992 | Funami et al. |
| 5,142,473 A | 8/1992 | Davis |
| 5,169,348 A | 10/1992 | Ogiwara et al. |
| 5,171,172 A | 12/1992 | Heaton et al. |
| 5,263,432 A | 11/1993 | Davis |
| 5,352,137 A | 10/1994 | Iwai et al. |
| 5,366,393 A * | 11/1994 | Uenage ............... B63H 20/10 440/1 |
| 5,385,110 A | 1/1995 | Bennett et al. |
| 5,474,012 A | 12/1995 | Yamada et al. |
| 5,474,013 A | 12/1995 | Wittmaier |
| 5,507,672 A | 4/1996 | Imaeda |
| 5,540,174 A | 7/1996 | Kishi et al. |
| 5,647,780 A | 7/1997 | Hosoi |
| 5,683,275 A | 11/1997 | Nanami |
| 5,707,263 A | 1/1998 | Eick et al. |
| 5,785,562 A | 7/1998 | Nestvall |
| 5,832,860 A | 11/1998 | Lexau |
| 5,879,209 A | 3/1999 | Jones |
| 6,007,391 A | 12/1999 | Eilert |
| 6,095,077 A | 8/2000 | DeAgro |
| 6,167,830 B1 | 1/2001 | Pilger |
| 6,273,771 B1 | 8/2001 | Buckley et al. |
| 6,298,824 B1 | 10/2001 | Suhre |
| 6,322,404 B1 | 11/2001 | Magee et al. |
| 6,354,237 B1 | 3/2002 | Gaynor et al. |
| 6,458,003 B1 | 10/2002 | Krueger |
| 6,583,728 B1 | 6/2003 | Staerzl |
| 6,733,350 B2 | 5/2004 | Iida et al. |
| 6,745,715 B1 | 6/2004 | Shen et al. |
| 6,994,046 B2 | 2/2006 | Kaji et al. |
| 6,997,763 B2 | 2/2006 | Kaji |
| 7,143,363 B1 | 11/2006 | Gaynor et al. |
| 7,156,709 B1 | 1/2007 | Staerzl et al. |
| 7,188,581 B1 | 3/2007 | Davis et al. |
| 7,311,058 B1 | 12/2007 | Brooks et al. |
| 7,347,753 B1 | 3/2008 | Caldwell et al. |
| 7,389,165 B2 | 6/2008 | Kaji |
| 7,416,456 B1 | 8/2008 | Gonring et al. |
| 7,462,082 B2 | 12/2008 | Kishibata et al. |
| 7,530,865 B2 | 5/2009 | Kado et al. |
| 7,543,544 B2 | 6/2009 | Yap |
| 7,617,026 B2 | 11/2009 | Gee et al. |
| 7,641,525 B2 | 1/2010 | Morvillo |
| 7,942,711 B1 | 5/2011 | Swan |
| 7,958,837 B1 | 6/2011 | Fraleigh |
| 7,972,243 B2 | 7/2011 | Kado et al. |
| 8,011,982 B1 | 9/2011 | Baier et al. |
| 8,113,892 B1 | 2/2012 | Gable et al. |
| 8,145,370 B2 | 3/2012 | Borrett |
| 8,216,007 B2 | 7/2012 | Moore |
| 8,261,682 B1 | 9/2012 | DeVito |
| 8,376,791 B2 | 2/2013 | Chiecchi |
| 8,376,793 B2 | 2/2013 | Chiecchi |
| 8,388,390 B2 | 3/2013 | Kuriyagawa et al. |
| 8,428,799 B2 | 4/2013 | Cansiani et al. |
| 8,444,446 B2 | 5/2013 | Kuriyagawa et al. |
| 8,457,820 B1 | 6/2013 | Gonring |
| 8,480,445 B2 | 7/2013 | Morvillo |
| 8,583,300 B2 | 11/2013 | Oehlgrien et al. |
| 8,622,777 B1 | 1/2014 | McNalley et al. |
| 8,631,753 B2 | 1/2014 | Morvillo |
| 8,740,658 B2 | 6/2014 | Kuriyagawa |
| 8,764,500 B2 | 7/2014 | Kuriyagawa et al. |
| 8,807,059 B1 | 8/2014 | Samples et al. |
| 8,855,890 B2 | 10/2014 | Egle et al. |
| 8,858,278 B2 | 10/2014 | Morvillo |
| 9,052,717 B1 | 6/2015 | Walser et al. |
| 9,068,855 B1 | 6/2015 | Guglielmo |
| 9,278,740 B1 | 3/2016 | Andrasko et al. |
| 9,290,252 B1 | 3/2016 | Tuchscherer et al. |
| 9,359,057 B1 | 6/2016 | Andrasko et al. |
| 9,381,989 B1 | 7/2016 | Poirier |
| 9,463,858 B1 | 10/2016 | Remmers et al. |
| 9,598,160 B2 | 3/2017 | Andrasko et al. |
| 9,643,698 B1 | 5/2017 | Andrasko et al. |
| 2003/0013359 A1 | 1/2003 | Suganuma et al. |
| 2004/0106337 A1* | 6/2004 | Okabe .................. B63H 20/08 440/61 S |
| 2005/0245147 A1 | 11/2005 | Takada et al. |
| 2007/0089660 A1 | 4/2007 | Bradley |
| 2011/0263167 A1 | 10/2011 | Chiecchi |
| 2012/0272538 A1 | 11/2012 | Moore |
| 2013/0312651 A1 | 11/2013 | Gai |
| 2013/0340667 A1 | 12/2013 | Morvillo |
| 2014/0209007 A1 | 7/2014 | Morvillo |
| 2014/0220837 A1* | 8/2014 | Kuriyagawa ........... B63H 21/21 440/1 |
| 2014/0224166 A1 | 8/2014 | Morvillo |
| 2014/0295717 A1 | 10/2014 | Kuriyagawa et al. |
| 2016/0068247 A1 | 3/2016 | Morvillo |

OTHER PUBLICATIONS

Mercury Marine, 90-8M0081623 JPO Owners Manual—Auto Trim Portion, Section 2—On the Water, May 2013, p. 21.
Mercury Marine, 90-8M0076286 JPO Service Manual—Auto Trim Portion, Theory of Operation, Jul. 2013, p. 2A-5.

* cited by examiner

METHODS FOR AUTOMATICALLY CONTROLLING ATTITUDE OF A MARINE VESSEL DURING LAUNCH

FIELD

The present disclosure relates to systems and methods for controlling an attitude of a marine vessel by way of a trim control system.

BACKGROUND

Each of the below U.S. Patents and Applications is hereby incorporated herein by reference.

U.S. Pat. No. 4,776,818 discloses an electrical control system for trimming a pair of stern motors or drives mounted side-by-side on a boat. The two drives are both jointly and independently movable through a plurality of trim positions. The system includes two trim cylinders, each coupled to one associated drive, to move its associated drive to different trim positions both jointly as well as independently of each other. An operator controlled mechanism energizes and de-energizes the two trim cylinders simultaneously to jointly vary the trim position of the two drives. Two lines, each coupled at its first end to one associated drive, independently detect both the angular trim position of its associated drive with respect to the other drive as well as detects the trim position of the two drives jointly. Detection apparatus is coupled to the second end of each of the two lines and is responsive to the two lines when the two drives are not in the desired equal trim position with respect to each other for controlling switches to inactivate one of the trim cylinders and thereby moves the other of the trim cylinders with respect to the inactivated one trim cylinder until the desired equal trim position is achieved between the two drives.

U.S. Pat. No. 4,861,292 discloses a system for optimizing the speed of a boat at a particular throttle setting that utilizes sensed speed changes to vary the boat drive unit position vertically and to vary the drive unit trim position. The measurement of boat speed before and after an incremental change in vertical position or trim is used in conjunction with a selected minimum speed change increment to effect subsequent alternate control strategies. Depending on the relative difference in before and after speeds, the system will automatically continue incremental movement of the drive unit in the same direction, hold the drive unit in its present position, or move the drive unit an incremental amount in the opposite direction to its previous position. The alternate control strategies minimize the effects of initial incremental movement in the wrong direction, eliminate excessive position hunting by the system, and minimize drive unit repositioning which has little or no practical effect on speed.

U.S. Pat. No. 6,007,391 discloses an automatically adjustable trim system for a marine propulsion system that provides automatic trimming of the propeller in response to increased loads on the propeller. A propulsion unit is attached to a boat transom through a tilt mechanism including a transom bracket and a swivel bracket. In a first embodiment, the transom bracket is clamped to a flexible transom which flexes in response to forces exerted on the transom during acceleration. In a second embodiment, the transom bracket is clamped to a transom bracket mounting platform that is generally parallel to and pivotally attached to the transom. A trim angle biasing mechanism is mounted between the transom and the transom bracket mounting platform for automatically adjusting the trim angle. A third embodiment includes a trim angle biasing mechanism incorporated into the transom bracket or swivel bracket. A fourth embodiment includes a spring-loaded pawl assembly between the swivel bracket and transom bracket.

U.S. Pat. No. 6,354,237 discloses a trim tab control system in which four buttons or switches are provided for the marine operator in which the operator can select to raise the bow, raise the stern, raise the port side of the boat, or raise the stern side of the boat in relative terms, and the system will automatically position the trim tabs to most efficiently achieve the operator's demanded change in position of the marine vessel.

U.S. Pat. No. 6,583,728 discloses a trim tab monitoring circuit which receives a signal that is representative of a voltage potential across a stator winding of a motor which is attached to the trim tab. This signal is passed through a high pass filter to remove the DC component of the signal, amplified, and passed through a low pass filter to remove certain high frequencies components of the signal. A zero crossing detector is used to discern individual pulses which are then received by a counter that provides a single output pulse for a predetermined number of input pulses. The series of output pulses from the counter are conditioned and, in conjunction with a direction sensor, provided to an up/down counter controller that provides digital signals to a signal output circuit. The signal output circuit provides a DC voltage output to a display and the DC output voltage is representative of the position of the trim tab.

U.S. Pat. No. 7,416,456 discloses an automatic trim control system that changes the trim angle of a marine propulsion device as a function of the speed of the marine vessel relative to the water in which it is operated. The changing of the trim angle occurs between first and second speed magnitudes which operate as minimum and maximum speed thresholds.

U.S. Pat. No. 8,457,820 discloses a method for controlling the operation of a marine vessel subject to porpoising. The method includes sensing an operational characteristic of the marine vessel which is indicative of porpoising of the marine vessel, and responding to the sensing of the operational characteristic with a response that is representative of the operational characteristic of the marine vessel as being indicative of the porpoising of the marine vessel.

U.S. Pat. No. 9,278,740 discloses a system for controlling an attitude of a marine vessel having first and second trim tabs includes a controller having vessel roll and pitch control sections. The pitch control section compares an actual vessel pitch angle to a predetermined desired vessel pitch angle and outputs a deployment setpoint that is calculated to achieve the desired pitch angle. The roll control section compares an actual vessel roll angle to a predetermined desired vessel roll angle, and outputs a desired differential between the first and second deployments that is calculated to maintain the vessel at the desired vessel roll angle. When the controller determines that the magnitude of a requested vessel turn is greater than a first predetermined threshold, the controller decreases the desired differential between the first and second deployments, and accounts for the decreased desired differential deployment in its calculation of the first and second deployments.

U.S. Pat. No. 9,598,160 discloses a system and method controlling a trim device that positions a trimmable marine apparatus with respect to a marine vessel. A trim system is operated in an automatic mode, in which a controller sends signals to actuate the trim device automatically as a function of vessel or engine speed, or a manual mode, in which the controller sends signals to actuate the trim device in response to commands from an operator input device. An operating speed of the propulsion system is determined. When the operating speed has crossed a given operating speed threshold, the trim system is subsequently operated in the automatic or manual mode depending on whether the operating speed increased or decreased as it crossed the operating speed threshold and whether the trim system was operating in the automatic or manual mode as the operating speed crossed the operating speed threshold.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one example of the present disclosure, a method is disclosed for automatically controlling a trim position of a trimmable marine propulsion device with respect to a marine vessel, the propulsion device being powered by a propulsion system. The method is carried out by a control module and includes operating the propulsion system at an initial operating speed associated with a first position of an operator input device. In response to determining that the operator input device has been advanced to a second position, the control module operates the propulsion system at a subsequent operating speed that is greater than the initial operating speed. The method also includes determining a rate at which the operator input device was advanced from the first position to the second position. In response to each of the following conditions being true, the control module utilizes a successively measured operating speed of the propulsion system and an offset trim profile relating operating speed to trim position to determine corresponding a setpoint trim position for the propulsion device: (a) the first position of the operator input device is less than a predetermined first threshold; (b) the second position of the operator input device is greater than or equal to a predetermined second threshold that is higher than the first threshold; and (c) the rate is greater than or equal to a predetermined rate. As the measured operating speed of the propulsion system increases from the initial operating speed to the subsequent operating speed, the control module controls a trim actuator to rotate the propulsion device to the setpoint trim position corresponding to the measured operating speed. A propulsion system operating speed at which the propulsion device begins trimming up from a minimum trim position is less according to the offset trim profile than according to a base trim profile relating operating speed to trim position, which base trim profile is utilized to determine the setpoint trim position when at least one of conditions (a), (b), and (c) is not true.

According to another example of the present disclosure, a method is disclosed for automatically controlling a trim position of a trimmable marine propulsion device with respect to a marine vessel, the propulsion device being powered by a propulsion system. The method is carried out by a control module and includes receiving operator demands corresponding to operating speeds of the propulsion system and determining a rate of change of demand versus time between an initial operator demand corresponding to an initial operating speed and a subsequent operator demand corresponding to a subsequent operating speed that is greater than the initial operating speed. In response to the rate of change of demand exceeding a predetermined rate, the control module uses a successively measured operating speed of the propulsion system and an offset trim profile relating operating speed to trim position to determine a corresponding setpoint trim position for the propulsion device. As the measured operating speed of the propulsion system increases from the initial operating speed to the subsequent operating speed, the control module controls a trim actuator to rotate the propulsion device to the setpoint trim position corresponding to the measured operating speed. A propulsion system operating speed at which the propulsion device begins trimming up from a minimum trim position is less according to the offset trim profile than according to a base trim profile relating operating speed to trim position, which base trim profile is utilized to determine the setpoint trim position when the rate of change does not exceed the predetermined rate.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
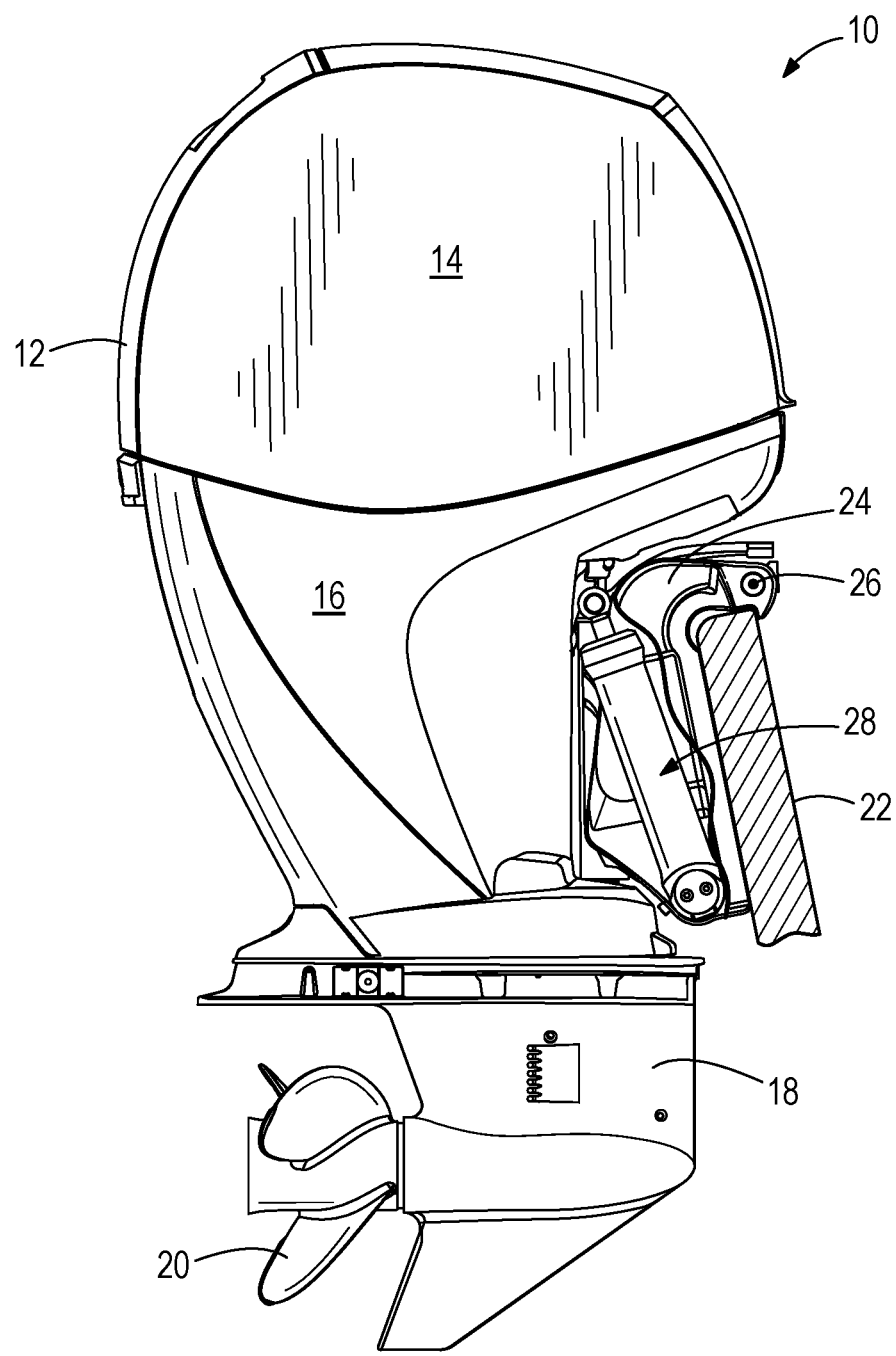
FIG. 1 illustrates one example of a marine propulsion device according to the present disclosure.

In the present description, certain terms have been used for brevity, clarity and understanding. No unnecessary limitations are to be inferred therefrom beyond the requirement of the prior art because such terms are used for descriptive purposes only and are intended to be broadly construed.

The present disclosure relates to systems and methods for automatically controlling trim positions of trimmable propulsion devices on a marine vessel by controlling one or more trim actuators that couple the trimmable propulsion devices to the transom of the marine vessel. In one example, each trim actuator is a hydraulic piston-cylinder in fluid communication with a hydraulic pump-motor combination, although the principles of some of the below examples could apply equally to electric linear actuators, pneumatic actuators, or other types of trim devices. The trim actuator may be actuated between an extended position and a retracted position by provision of hydraulic fluid, electrical power, pneumatic fluid, etc. The extension and retraction of such trim actuators can be used to rotate trimmable propulsion devices, such as but not limited to outboard motors or the outboard portions of sterndrives or pod drives, up and down with respect to a marine vessel to which they are coupled.

Such propulsion devices can be powered by propulsion systems, including, but not limited to, internal combustion engines, electric motors, rotating shafts, transmissions, clutches, and/or gear trains.

Those skilled in the art of marine vessel propulsion and control are familiar with many different ways in which the trim position of a propulsion device can be varied to change the handling or feel of the vessel. For example, many manual trim control systems are known to those skilled in the art. In typical operation, the operator of a marine vessel can change the trim position of an associated propulsion device as the velocity of the vessel changes. This is done to maintain an appropriate angle of the vessel with respect to the water as it accelerates, achieves a planing speed, and as it increases its velocity over the water while on plane. The operator inputs a command to change the trim position for example by using a keypad, button, or similar input device with "trim up" and "trim down" input choices. The operator can select these input choices to trim the propulsion device up or down until a desired handling or feel of the vessel over the water is achieved.

The systems of the present disclosure are also capable of carrying out automatic trim (auto-trim) methods, in which the propulsion device is automatically trimmed up or down with respect to its current position, depending on a desired attitude of the marine vessel with respect to an operating speed of the propulsion system (for example, engine speed and/or vessel speed). Auto-trim systems perform the trim operation automatically, as a function of engine speed and/or vessel speed, without requiring intervention by the operator of the marine vessel. The automatic change in trim angle of the propulsion device enhances the operation of the marine vessel as it accelerates, achieves planing speed, and further increases its velocity over the water while on plane.

FIG. 1 illustrates ones example of a trimmable marine propulsion device 10, which in this example is an outboard motor 12. In other examples, the propulsion device 10 could be a trimmable sterndrive, trimmable pod drive, trimmable jet drive, or the like. The outboard motor 12 includes a powerhead section 14 connected via a midsection 16 to a lower unit 18, including a propeller 20 that provides propulsive force as it rotates through water. In other examples, the propulsion device 10 includes an impeller or a jet pump for providing propulsive force. The outboard motor 12 is coupled to a transom 22 of a marine vessel 30 (see FIGS. 2-4) by way of a mounting bracket 24. The outboard motor 12 is rotatable up and down with respect to the vessel 30 about a tilt/trim axis 26 by way of extension and retraction of a trim actuator 28. As mentioned above, the trim actuator 28 can be a hydraulic, pneumatic, or electric device.

Figure 2:
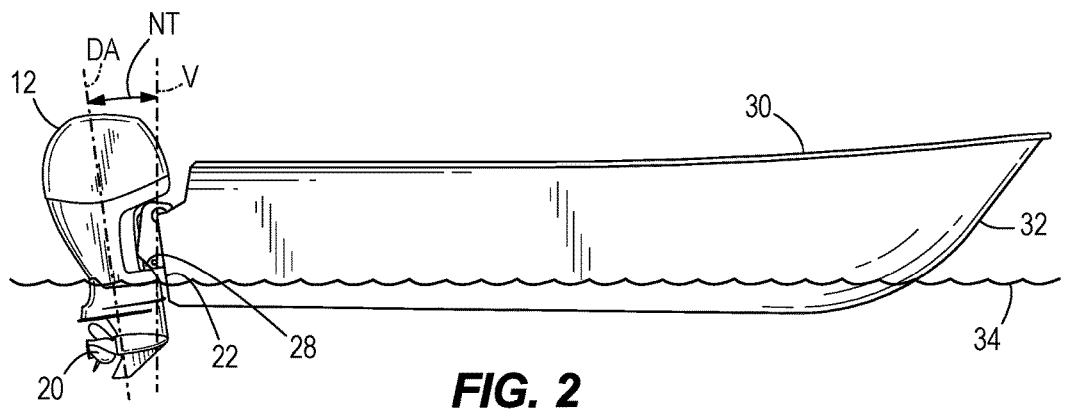
FIGS. 2-4 illustrate a marine vessel having a marine propulsion device coupled to its transom, wherein the marine propulsion device is positioned at different trim angles with respect to the marine vessel.
Figure 3:
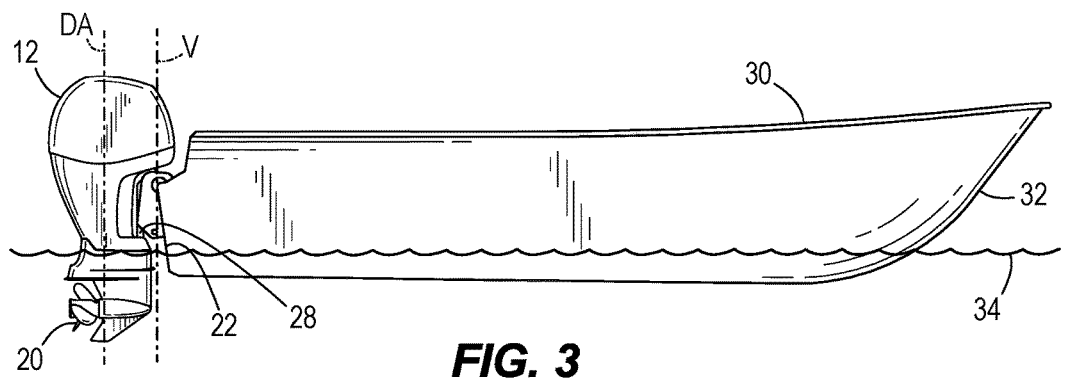
Figure 4:
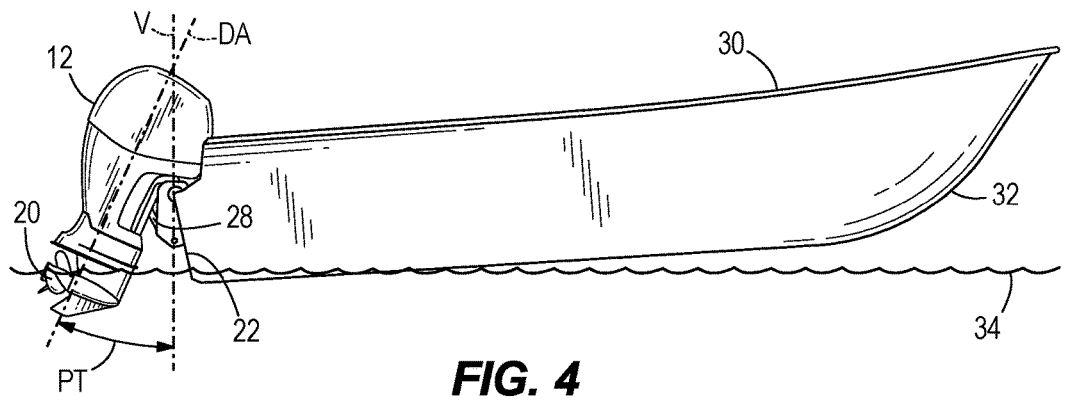

FIGS. 2-4 illustrate one example of a marine vessel 30 having a system for controlling an attitude of the marine vessel 30 by way of controlling a trim position of the trimmable marine propulsion device 10 with respect to a marine vessel 30. In this example, the marine vessel 30 is equipped with one or more outboard motors 12 on its transom 22. The outboard motor(s) 12 can be trimmed to different angles with respect to the transom 22 via the trim actuator 28 as known to those having ordinary skill in the art. In FIG. 2, the outboard motor 12 is shown in a trimmed in (trimmed down) position. This can be seen by comparing driveshaft axis DA of the outboard motor 12 with vertical line V, where the lines DA and V will intersect below where the outboard motor 12 is connected to the transom 22 at negative trim angle NT. In FIG. 3, the outboard motor 12 is shown in a neutral (level) trim position, in which the outboard motor 12 is in more or less of a vertical position.

Here, driveshaft axis DA is generally parallel to vertical line V. In FIG. 4, the outboard motor 12 is shown in a trimmed out (trimmed up) position. The lines DA and V will intersect above the outboard motor's connection point to the transom 22 at positive trim angle PT.

The trim positions in FIGS. 2 and 3 are generally used when the marine vessel 30 is operating at slower speeds. For example, the trim position in FIG. 2 is often used during launch of the marine vessel 30, before the marine vessel has gotten up to speed and on plane. The trim position shown in FIG. 3 is often used when the marine vessel 30 is in a joysticking or docking mode. In contrast, the trim position shown in FIG. 4 is often used when the marine vessel 30 is on-plane and high speeds are required. At high speeds, the trim position shown in FIG. 4 causes the bow 32 of the marine vessel 30 to rise out of the water 34 as shown. Thus, while launching, the outboard motor 12 progresses from the trimmed-in position of FIG. 2, through the neutral trim position of FIG. 3, and to the trimmed-out position of FIG. 4. The time it takes for the outboard motor 12 to be trimmed up from the position of FIG. 2 to that of FIG. 4 varies depending on the type and configuration of the trim actuator 28 and how and where the trim actuator 28 is coupled to the outboard motor 12.

Figure 5:
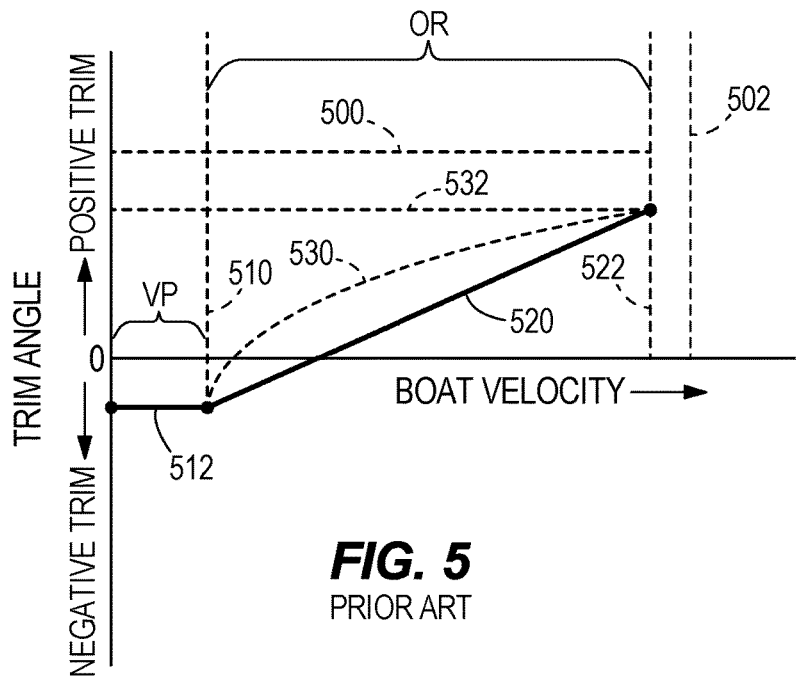
FIG. 5 illustrates one example of a known general relationship between vessel speed and trim position.

FIG. 5 is a graphical representation showing an exemplary prior art relationship between the trim angle of a propulsion device 10 and the velocity of a marine vessel 30 according to an exemplary auto-trim method. It should be noted that the graph shown in FIG. 5 is meant to show position of a propulsion device 10 such as an outboard motor or a sterndrive according to the positive and negative trim angle conventions described herein with respect to FIGS. 2-4. However, other conventions could be used. For example, note that in addition to describing the trim positions in terms of negative, neutral, and positive trim angles, the positions could also be described in terms of percentages of a maximum trim position. Generally, the maximum trim position is one where enough of the propeller 20 is below the surface of the water 34 to have a practical effect on propelling the vessel, and is specified during calibration of the trim system. Referring back to FIGS. 2-4, the negative trim angle NT shown in FIG. 2 would correspond to 0% of a maximum trim position, the neutral trim position shown in FIG. 3 would correspond to anywhere between about 5% and about 10% of maximum, and the positive trim angle PT shown in FIG. 4 would correspond to 100% of maximum.

Returning to FIG. 5, dashed line 500 represents a maximum positive trim angle PT of the propulsion device 10 that will maintain the propeller 20 of the propulsion device 10 in the water at a functional position. Dashed line 502 represents the maximum velocity of the marine vessel 30. Dashed line 510 represents the planing speed of the marine vessel 30. Line 512 represents the change in velocity of the marine vessel 30 from a stationary condition to the achievement of planing speed at dashed line 510. This increase in velocity is identified as VP in FIG. 5. In one example, the trim angle of the propulsion device 10 is maintained at a negative magnitude of NT such as shown in FIG. 2. This negative trim angle is maintained until the marine vessel 30 reaches planing speed 510. Then, the trim angle is increased as a function of vessel speed as indicated by line 520 in FIG. 5. This continues until the marine vessel 30 achieves a velocity which is represented by dashed line 522. It can be seen that this velocity represented by dashed line 522 is less than the maximum velocity 502 of the marine vessel 30. The range of speeds between dashed lines 510 and 522 is identified as its operating range OR between first and second speed magnitudes during which the trim angle is changed, according to this example, as a function of the vessel speed. In FIG. 5, this rate of change is linear as represented by line 520. However, as represented by dashed line 530, this relationship need not be linear in all applications. Dashed line 532 represents the maximum trim that is achieved during automatic trim operation when the marine vessel 30 achieves the second speed magnitude 522. In one example, this maximum trim is trim angle PT shown in FIG. 4.

Note that although vessel speed is shown as being the input and trim angle as the output, engine speed could instead be the input used to determine trim angle. In other examples, both vessel speed and engine speed can be used together or at different times throughout vessel launch to determine the trim angle. Additionally, note that the output need not be an angular value, but instead could be a percentage of maximum trim, as described herein above. In such an example, the trim percentage may be a positive value, while the trim angle to which the percentage corresponds may in fact be a negative trim angle according to the conventions provided herein above.

Figure 7:
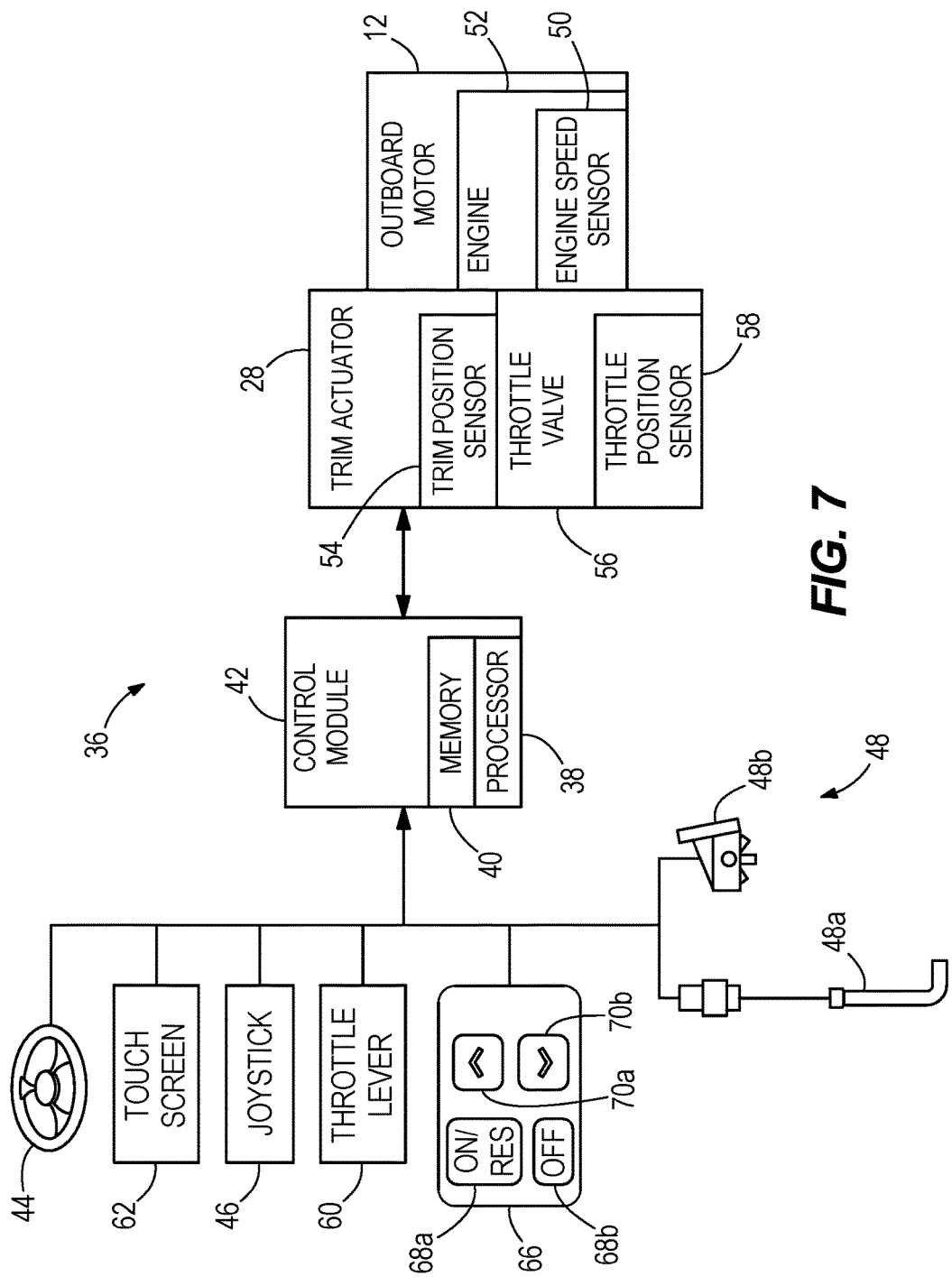
FIG. 7 illustrates one example of a control system for controlling a position of a trimmable propulsion device with respect to a marine vessel.

Skipping ahead for a moment, FIG. 7 shows an example of a propulsion system 36 for the marine vessel 30 of FIGS. 2-4, which carries out the methods described herein below. In one example, software, which when executed by a processor 38 carries out the methods of the present disclosure, can be loaded in a memory 40 of a control module 42, such as an engine control module, a trim control module, a helm control module, etc. However, it should be understood that a separate control module could be provided for carrying out the methods described herein or that the methods described herein could be carried out by any combination of the above-described control modules.

As used herein, the term "control module" may refer to, be part of, or include an application specific integrated circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip (SoC). A control module may include memory (shared, dedicated, or group) that stores code executed by the processing system. The term "code" may include software, firmware, and/or microcode, and may refer to programs, routines, functions, classes, and/or objects. The term "shared" means that some or all code from multiple control modules may be executed using a single (shared) processor. In addition, some or all code from multiple control modules may be stored by a single (shared) memory. The term "group" means that some or all code from a single control module may be executed using a group of processors. In addition, some or all code from a single control module may be stored using a group of memories.

The control module 42 communicates with one or more components of the propulsion system 36 via the I/O interfaces and a communication link, which can be a wired or wireless link. The control module 42 is capable of monitoring and controlling one or more operational characteristics of the propulsion system 36 and its various subsystems by sending and receiving control signals via the communication link. In one example, the communication link is a controller area network (CAN) bus, but other types of links could be used. It should be noted that the extent of connections of the communication link shown herein is for schematic purposes only, and the communication link in fact provides communication between the control module 42 and each of the peripheral devices noted herein, although not every connection is shown in the drawing for purposes of clarity.

The control module 42 receives inputs from several different sensors and/or input devices aboard the marine vessel 30. For example, the control module 42 receives a steering input from a steering wheel 44 and/or joystick 46. The control module 42 is also provided with an input from a vessel speed sensor 48. The vessel speed sensor 48 may be, for example, a pitot tube sensor 48*a*, paddle wheel type sensor 48*b*, or any other speed sensor appropriate for sensing the actual speed of the marine vessel 30 in miles per hour (mph) or kilometers per hour (kph). The vessel speed may instead be obtained by taking readings from a GPS device (not shown), which calculates speed by determining how far the vessel 30 has traveled in a given amount of time. The outboard motor 12 is provided with an engine speed sensor 50 such as a tachometer that determines a speed of an engine 52 powering the outboard motor 12 in rotations per minute (RPM). This reading could be used, along with other data, to determine a pseudo vessel speed. A trim position sensor 54 is also provided for sensing an actual position of the trim actuator 28, for example, an amount of extension of a hydraulic cylinder, which corresponds to the trim position of the propulsion device 10. The trim position sensor 54 may be any type of sensor known to those having ordinary skill in the art, such as a Hall Effect sensor or a potentiometer. A throttle valve 56 and a throttle position sensor 58 are also provided with the engine 52.

Other inputs can come from operator input devices such as a throttle lever 60, a touchscreen 62, and a keypad 66. The touchscreen 62 or the keypad 66 can be used to initiate or exit any number of control or operation modes, such as auto-trim mode, or to make selections while operating within one of the selected modes. For example, on the keypad 66, button 70*a* can be used to manually trim up the propulsion device 10, and button 70*b* can be used to manually trim down. Button 68*a* can start or resume auto-trim, and button 68*b* can exit auto-trim. The touchscreen 62 can also display operational characteristics to the operator of the vessel and can allow the operator to access propulsion system modes such as autoheading, waypoint tracking, autopilot, and/or electronic anchoring. In each of these modes, the control module 42 will automatically control the steering position of the outboard motor 12 and/or the position of the throttle valve 56 to operate the propulsion system 36 in the selected mode.

Figure 8:
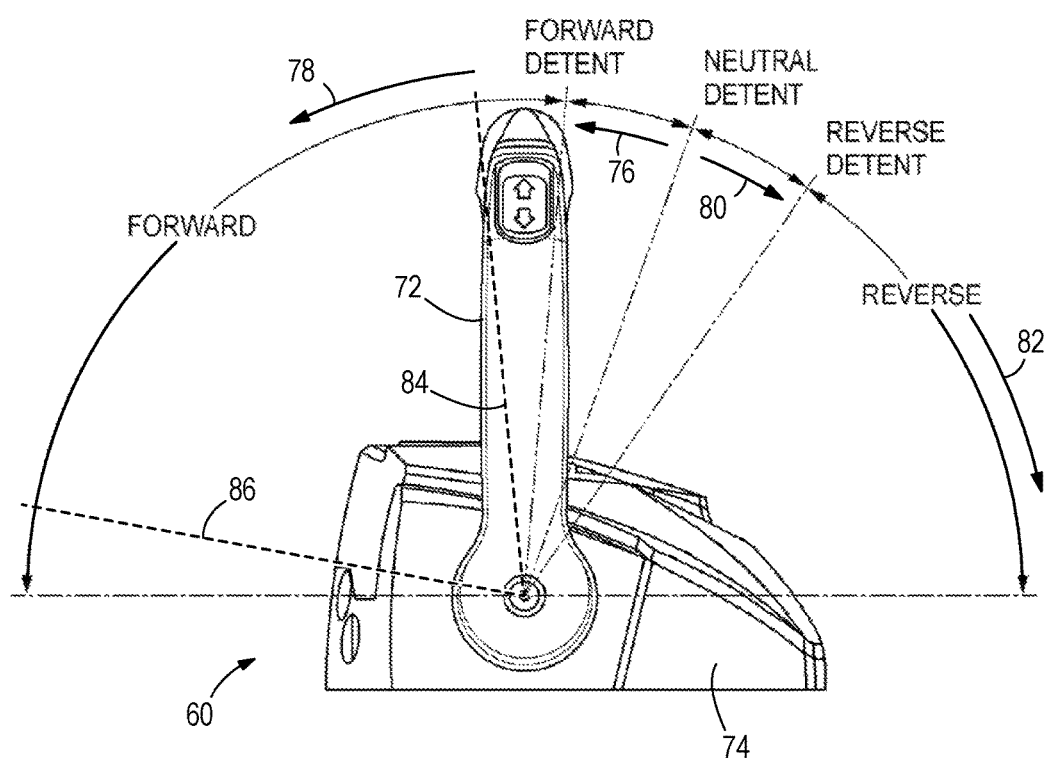
FIG. 8 illustrates one example of an operator input device comprising a throttle lever.

The throttle lever 60 allows the operator of the marine vessel 30 to choose to operate the vessel 30 in neutral, forward, or reverse, as is known. Referring to FIG. 8, which shows one example of a throttle lever 60, a number of positions to which the handle portion 72 of the throttle lever 60 can be actuated are described in more detail. For example, the handle portion 72 can be advanced within the base portion 74 of the throttle lever 60 from a neutral detent position to a forward detent position (see arrow 76), in which the engine 52 of the outboard motor 12 is in gear, but idling. Thereafter, the throttle lever 60 can be advanced further in the forward direction (in the direction of arrow 78) to cause the engine 52 and the propeller 20 to rotate in forward gear and thereby provide forward thrust to the marine vessel 30. As the operator continues to move the throttle lever 60 in the forward direction along arrow 78, the control module 42 will increasingly open the throttle valve 56 providing air to the engine 52, thereby increasing the speed of the engine 52 and propeller 20, and thus the speed of the marine vessel 30. If the throttle lever 60 is retracted in the opposite direction, the control module 42 will increasingly close the throttle valve 56, causing the marine vessel 30 to slow down. If the throttle lever 60 is retracted from neutral detent to reverse detent (see arrow 80), the outboard motor 12 is put in reverse gear, but idling. As the throttle lever 60 is moved even more in the reverse direction (see arrow 82), the throttle valve 56 is increasingly opened and the outboard motor 12 provides reverse thrust to the marine vessel 30.

Note that the throttle lever 60 is in signal communication with the control module 42, which receives signals from the throttle lever 60 and interprets them in, for example, one of two ways. In one example, the control module 42 interprets the position of the throttle lever 60 as a vessel speed request and therefore as being directly translated to the position of the throttle valve 56, wherein the neutral detent position corresponds to a closed throttle valve 56, and a maximum forward position of the throttle lever 60 corresponds to a fully open throttle valve 56. The throttle valve's position can be controlled via a feedback loop using signals from the throttle position sensor 58, and in turn results in a desired vessel speed. In another example, the control module 42 interprets the position of the throttle lever 60 as a request for a particular speed of the engine 52. The control module 42 can predict a position of the throttle valve 56 that is required to obtain the desired engine speed. The engine speed can then be obtained from the engine speed sensor 50, and the throttle valve's position adjusted until the desired engine speed is achieved. Thus, the position of the throttle lever 60 corresponds to a propulsion system operating speed, which can be thought of in terms of a vessel speed and/or an engine speed.

Sometimes when launching the vessel 30, the operator will advance the throttle lever 60 very quickly from neutral detent, forward detent, or a forward gear position that corresponds to a slow propulsion system operating speed to a position that is at or near the maximum forward gear position. Such a maneuver is typically referred to as requesting a "hole shot," which is rapid acceleration of the vessel 30, i.e. from a dead-stop or very slow speed until the vessel 30 is "on-plane" and riding on top of the water 34. Through research and development, the present inventors have realized that programming the control module 42 to recognize when a hole shot has been requested, and thereafter to trim the propulsion device 10 up earlier than a typical trim profile (see, for example, FIG. 5) would otherwise dictate, can result in faster acceleration of the vessel 30, especially for vessels equipped with slower trim systems.

Figure 9:
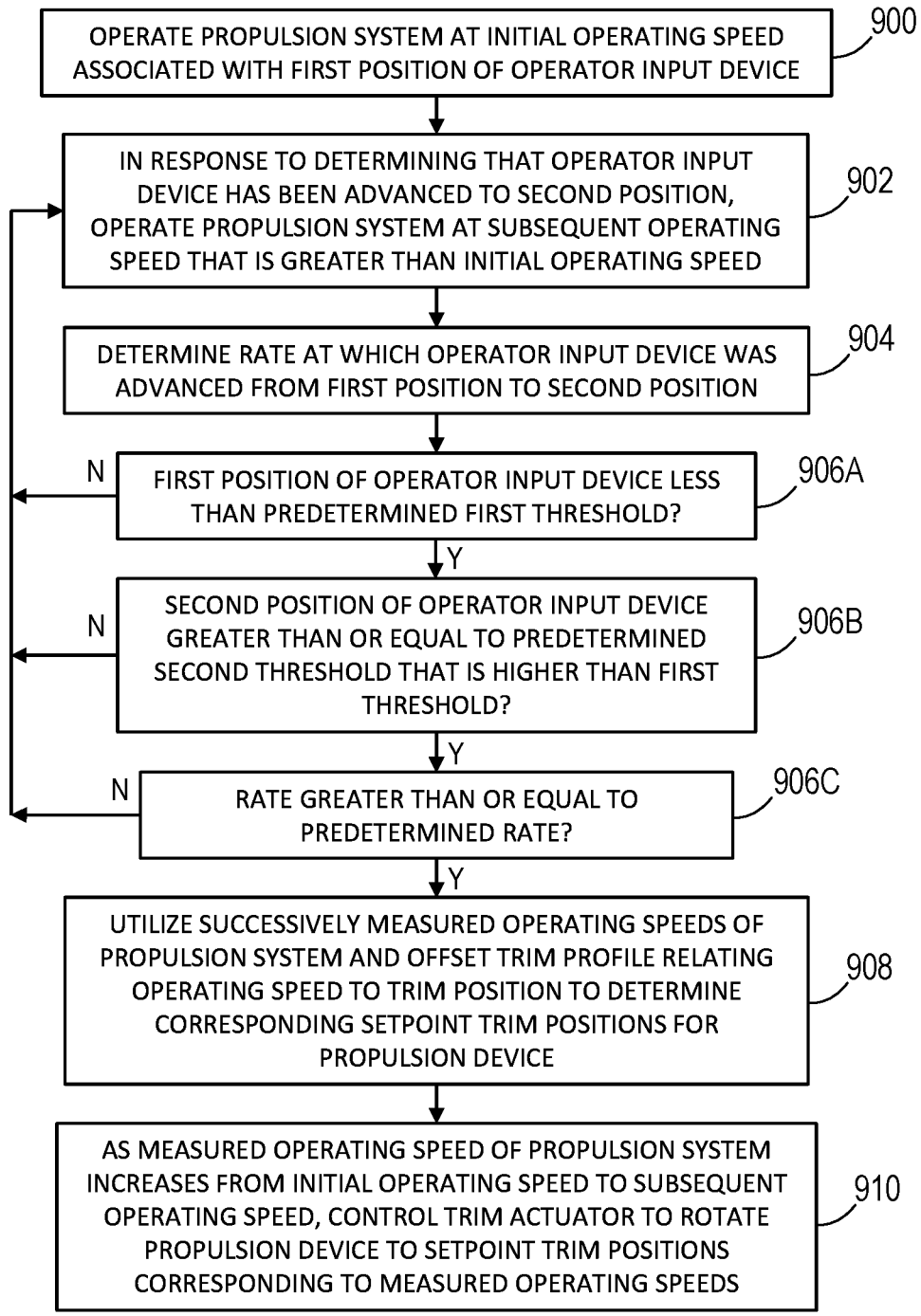
FIGS. 9 and 10 illustrate methods for automatically controlling a trim position of a trimmable marine propulsion device with respect to a marine vessel.

FIG. 9 shows one example of a method for automatically controlling a trim position of a trimmable marine propulsion device 10 with respect to a marine vessel 30, the propulsion device 10 being powered by a propulsion system 36. The method is carried out by a control module 42. As shown at 900, the method includes operating the propulsion system 36 at an initial operating speed associated with a first position of an operator input device. For example, the initial operating speed can be an initial desired vessel speed or an initial desired engine speed associated with an initial position of the throttle lever 60. A shown at 902, the method next includes operating the propulsion system 36 at a subsequent operating speed that is greater than the initial operating speed in response to determining that the operator input device has been advanced to a second position. For example, the subsequent operating speed can be a subsequent desired vessel speed or a subsequent desired engine speed associated with a subsequent position of the throttle lever 60. The method may also include, as shown at 904, determining a rate at which the operator input device was advanced from the first position to the second position. For example, the control module 42 may note a clock time at which the throttle lever 60 was moved away from its initial position and a clock time at which the throttle lever 60 was stopped at its subsequent position, and calculate the elapsed time between the clock times. Alternatively, the control module 42 can start a timer when the throttle lever 60 is moved away from its initial position and stop the timer when the throttle lever 60 is stopped at is subsequent position. In still another example, a predetermined threshold time could be saved in the memory 40, and the control module 42 could compare a measured time it takes for the throttle lever 60 to be moved from at or below a lower threshold position to at or above an upper threshold position to the predetermined threshold time. This method for detecting a hole shot would not necessarily require the handle 72 of the throttle lever 60 to stop in order for the rate at which the operator input device was advanced to be calculated. In one example, the lower threshold position could be between about 0% and about 15% of a full forward operating range (between forward detent and a maximum forward position) of the throttle lever 60, and the upper threshold position could be between about 85% and about 100% of the full forward operating range of the throttle lever 60.

The control module 42 then uses the above information to determine if a hole shot has been requested, and if so, as shown at 908, utilizes a successively measured operating speed of the propulsion system 36 and an offset trim profile relating operating speed to trim position to determine a corresponding setpoint trim position for the propulsion device 10. More specifically, the control module 42 will utilize the offset trim profile in response to each of the following conditions being true: (a) the first position of the operator input device is less than a predetermined first threshold (see 906A); (b) the second position of the operator input device is greater than or equal to a predetermined second threshold that is higher than the first threshold (see 906B); and (c) the rate is greater than or equal to a predetermined rate (see 906C). Each of the predetermined first threshold, the predetermined second threshold, and the predetermined rate can be stored in the memory 40 of the control module 42. The measured operating speed can be a measured vessel speed determined using the vessel speed sensor 48, the GPS receiver, or a pseudo vessel speed, as described herein above. The measured operating speed could instead or additionally be a measured engine speed, determined by the engine speed sensor 50.

As shown at 910, the method includes controlling the trim actuator 28 to rotate the propulsion device 10 to the setpoint trim position corresponding to the measured operating speed as the measured operating speed of the propulsion system 36 increases from the initial operating speed to the subsequent operating speed. According to the present disclosure, a propulsion system operating speed at which the propulsion device 10 begins trimming up from a minimum trim position (e.g., from negative trim angle NT) is less according to the offset trim profile than according to a base trim profile relating operating speed to trim position, which base trim profile is utilized to determine the setpoint trim position when at least one of conditions (a), (b), and (c) is not true.

Figure 6:
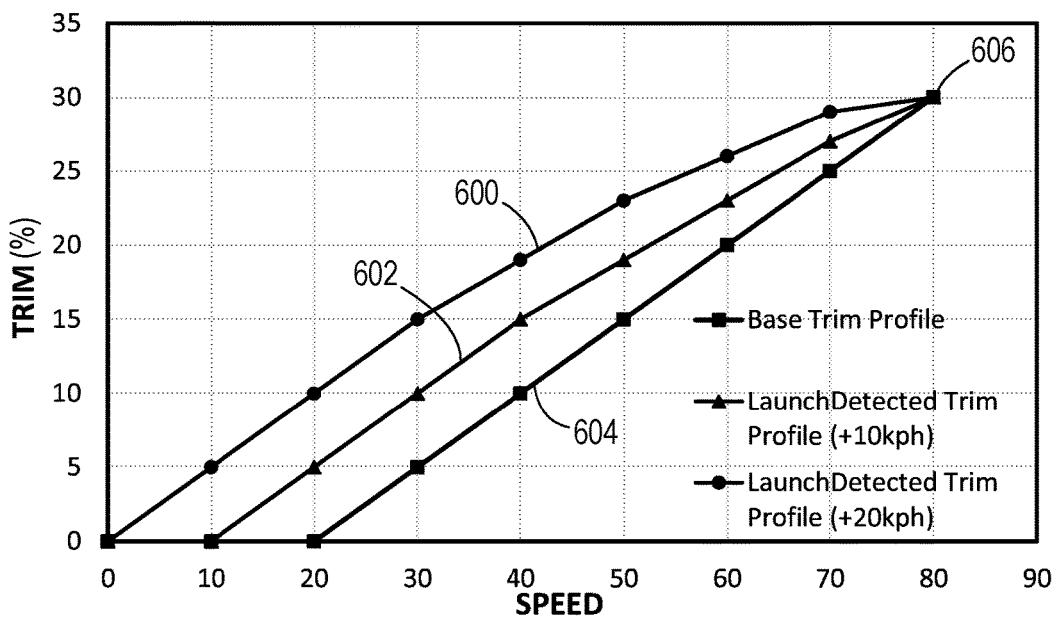
FIG. 6 illustrates examples of relationships between propulsion system operating speed and trim position according to the present disclosure, in contrast to a known relationship between propulsion system operating speed and trim position.

By way of further explanation, examples of offset trim profiles 600, 602 in comparison to a base trim profile 604 are shown in FIG. 6. Although the trim profiles are shown herein as being graphical, trim profiles defining optimal trim angles for different vessel/propulsion device combinations could also be stored in lookup tables, charts, or similar input-output maps or as equations. The base trim profile 604 is more or less the same as the prior art trim profile shown in FIG. 5, noting that trim positions are shown in percentages in FIG. 6 instead of angles as in FIG. 5. According to the base trim profile 604, the propulsion device 10 does not start trimming up from the minimum trim position (NT or 0%) until it reaches a speed at which it is on-plane (see explanation herein above of VP with respect to FIG. 5). In this example, this occurs at a speed of about 20 (mph, kph, or RPM, depending on whether vessel speed or engine speed being used as an input). In contrast, according to the offset trim profile 602, the propulsion device 10 begins trimming up from the minimum trim position of 0% at a speed of about 10. Note that this does not mean the vessel 10 is reaching its on-plane speed at 10 (mph, kph, RPM), but that the propulsion device 10 is trimmed up from the minimum trim position at 0% even before the vessel 30 gets on-plane. This means that the offset trim profile 602 is offset by a speed of 10 from the base trim profile 604, at least with respect to when the system first begins trimming. The offset trim profile 600 begins trimming the propulsion device 10 even sooner, and at least with respect to when the system first begins trimming, is offset by a speed of 20 from the base trim profile 604. According to the example shown herein, the propulsion device 10 will begin trimming just after it accelerates from a dead-stop when the offset trim profile 600 is utilized.

The control module 42 may be programmed with a calibrated amount by which always to offset the base trim profile 604 in response to detecting a hole shot. Alternatively, the offset amount is variable and depends on one or more of the vessel design, type of trim system, and/or rate of change between the first position and second position of the operator input device. An input-output map such as a look-up table could be stored in the memory 40, and the control module 42 could read a type of the propulsion device, a type of trim system, or a vessel type over a CAN network and use this information to determine how much to offset the base trim profile 604 or which one of several pre-calibrated offset trim profiles should be used. For example, if the trim actuator 28 is a particularly slow one and the vessel 30 is a particularly fast one, the control module 42 may choose to offset the base trim profile 604 by more than if the trim actuator 28 was a fast one and the vessel 30 was a relatively slow one. The control module 42 could do this by using an equation to modify the output from the base trim profile 604 or could select from predefined offset trim profiles, such as by selecting to use profile 600 over profile 602. The rate of change may also be used to determine the offset amount, wherein a more aggressive launch might result in a more aggressive offset of the trim profile.

Note also that in each of the offset trim profiles 600, 602, except for a maximum trim position, a trim position related to a given operating speed is greater according to the offset trim profile 600 or 602 than according to the base trim profile 604. For example, at an operating speed of 30 (mph, kph, or RPM), the trim position according to the base profile 604 is 5%. For many setups, this is barely shifting from the negative trim angle range to the positive trim angle range, or is still well within the negative trim angle range. In contrast, at the operating speed of 30, the trim position according to the offset trim profile 602 is 10%, and the trim position according to the offset trim profile 600 is 15%, the latter of which corresponds to a positive trim angle for most trim systems. Note that the maximum trim position (shown at 606) is identical according to both the base trim profile 604 and the offset trim profiles 600 and 602. This is because the maximum trim position is calibrated based on the geometry of the propulsion device 10 on the vessel 30, and is not affected by the speed of the trim system.

The effect of such offsetting of the base trim profile 604 when a hole shot is detected is that the trim system can begin trimming the propulsion device 10 sooner than it otherwise would if utilizing the base trim profile 604. Especially for slower trim systems, this means that trimming of the propulsion device 10 will not lag behind the vessel's acceleration, and once the vessel 30 rolls on-plane and really starts to pick up speed, its acceleration will not be held back by the trim system because the trim system was too slow or had to start at 0% at that moment. Rather, the offset trim profile will already have positioned the propulsion device 10 at optimal trim once the vessel 300 rolls over and really starts to accelerate. Additionally, the vessel 30 may be able to get up on-plane more quickly by utilizing one of the offset trim profiles 600 or 602 than by utilizing the base trim profile 604. Note that although only two offset trim profiles 600 and 602 are shown herein, there could be multiple offset trim profiles.

The first and second thresholds to which the first and second positions of the operator input device (e.g., throttle lever 60) are compared are values that are calibrated specifically to ensure that a hole shot is in fact requested. Generally, the first threshold corresponds to a propulsion system operating speed at which the vessel 30 is not on-plane (although it could correspond to a vessel speed at which the vessel 30 has just rolled on plane), while the second threshold corresponds to a propulsion system operating speed at which the vessel 30 is on-plane. For example, the first threshold is about ten percent of a maximum position of the operator input device and the second threshold is about ninety percent of the maximum position. In other words, in the example in which the throttle lever 60 is the operator input device, the first threshold is at about 10% of the way from forward detent to a maximum forward position. This is shown by dashed line 84 in FIG. 5. The second threshold then is at about 90% of the way from forward detent to the maximum forward position, as shown by dashed line 86. In another example, the first threshold is at about 15% and the second threshold is at about 85% of the way from forward detent to the maximum forward position. The required maximum elapsed time between the throttle lever 60 being at the first position and moving to the second position may be anywhere from about 1 second to about 2 seconds, for example. Thus, the predetermined rate is between about 40 percent of the maximum position of the operator input device per second to about 100 percent of the maximum position per second, or in another example between about 80 percent of the maximum position per second to about 100 percent of the maximum position per second, or in another example between about 40 percent of the maximum position per second to about 50 percent of the maximum position per second. The measured rate of movement of the operator input device does not need to fall within the specified range, but only needs to exceed the threshold, which threshold may fall within these ranges.

Other conditions may be required in order for a hole shot to be detected and the offset trim profile 600 or 602 to be used. As noted above, the measured operating speed of the propulsion system 36 can be a measured speed of the vessel 30. The method may include utilizing the offset trim profile 600 or 602 to determine the setpoint trim position in response to conditions (a), (b), and (c) being true, and in response to a first measured vessel speed associated with the first position of the operator input device (e.g., throttle lever 60) being less than a predetermined vessel speed. This check will safeguard against use of the offset trim profile when the vessel 30 is travelling at a high speed (say, 50 mph) and then the operator pulls back on the throttle lever 60 and shortly thereafter rapidly re-advances the throttle lever 60. Even if the operator pulled back to below the first threshold and then re-advanced to above the second threshold, there would be little need to use the offset trim profile. Because such quick movement of the throttle lever 60 is unlikely to result in much drop in vessel speed, and because trim position will lag slightly behind measured vessel speed anyhow, such an operator input is unlikely to result in much change in trim position. If the control module 42 had been using the base trim profile 604 before the operator's input, it will thus continue to use the base trim profile after such input. In one example, the predetermined vessel speed is about 10 mph. Other systems might be programmed such that the hole shot offset trim profile will only be used if the vessel accelerates from a dead-stop, or only if it accelerates from a rolling start.

Once the control module 42 has determined that it will utilize the offset trim profile to determine a setpoint trim position for the propulsion device 10, there are multiple determinations that would thereafter return the system to using the base trim profile 604. For example, in response to determining that the propulsion device 10 is at the maximum trim position (PT, 100%, or at 606, FIG. 6), the method further includes determining the setpoint trim position from the base trim profile 604 in response to subsequent changes in the measured operating speed of the propulsion system 36. This is because the propulsion device 10 is already trimmed up as high as is allowed, and the vessel 30 has completed its launch. Any other trimming thereafter, unless the operator pulls the throttle lever 60 all the way back to forward detent or neutral and re-launches, does not need to be more aggressive than that provided by the base trim profile 604.

While using the offset trim profile 600 or 602 to determine the setpoint trim position, the method may further include utilizing the base trim profile 604 to determine the setpoint trim position in response to determining that the measured vessel speed is no longer increasing. This might be the case if vessel speed is leveling off as it approaches its maximum on-plane speed. This might also be the case if vessel speed is decreasing, indicating that whatever hole-shot launch was once desired is completed or aborted. Also while utilizing the offset trim profile 600 or 602 to determine the setpoint trim position, the method may further include operating the propulsion system 36 at a new operating speed that is less than the subsequent operating speed in response to determining that the operator input device has been retracted to a third position, which is different from the second position, but could be the same as the first position. The control module 42 will then utilize the base trim profile 604 to determine the setpoint trim position. This achieves the same outcome as the example provided above with respect to determining that vessel speed is decreasing, but is based on the position of the throttle lever 60 rather than on a measured vessel speed. Again, trimming under the circumstances described immediately above does not need to be more aggressive than that provided by the base trim profile 604.

Figure 10:
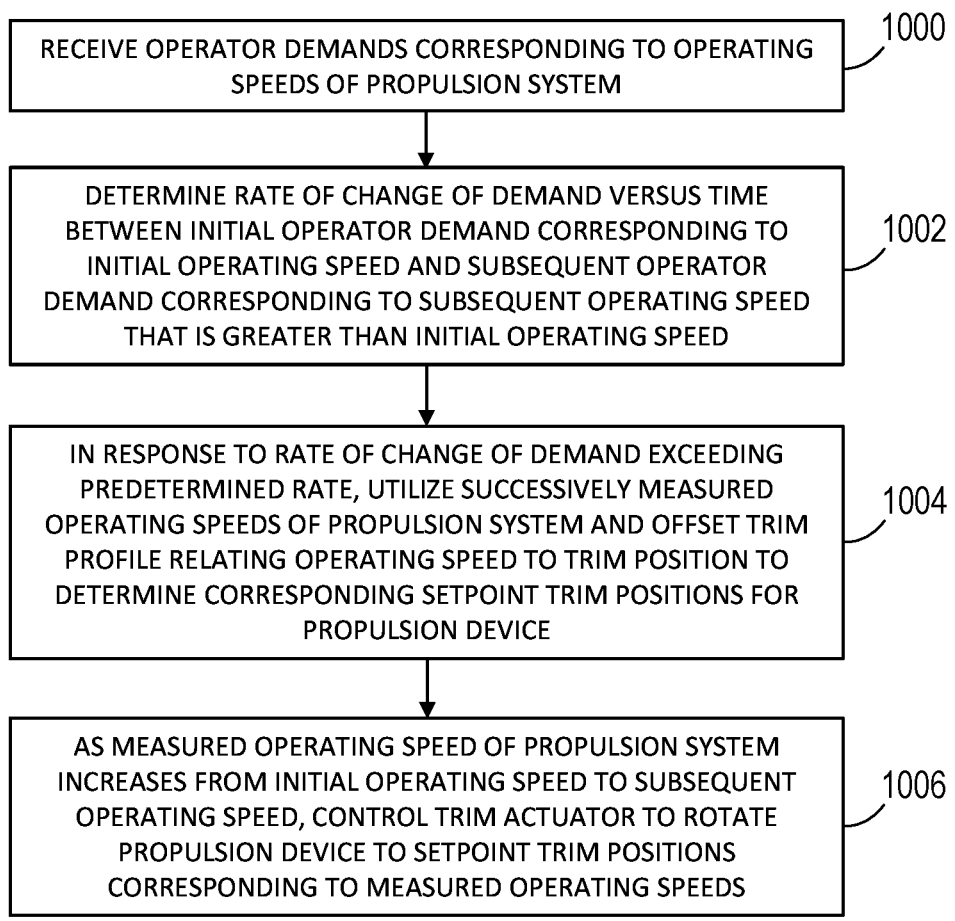

Another method for automatically controlling a trim position of a trimmable marine propulsion device 10 with respect to a marine vessel 30, the propulsion device 10 being powered by a propulsion system 36, is described with respect to FIG. 10. The method is carried out by a control module 42, and as shown at 1000, includes receiving operator demands corresponding to operating speeds of the propulsion system 36. These operator demands could be determined based on the position of the throttle lever 60 (e.g., the position of the handle portion 72 with respect to the base portion 74) or could correspond to other types of inputs. For example, the operator demands could be input via the joystick 46, the touchscreen 62, an autopilot program, a waypoint tracking program, or another automated maneuvering program. An operator demand could also be provided to the control module 42 in response to pressing of a "launch" button on the keypad 66 or touchscreen 62.

As shown at 1002, the method includes determining a rate of change of demand versus time between an initial operator demand corresponding to an initial operating speed and a subsequent operator demand corresponding to a subsequent operating speed that is greater than the initial operating speed. The rate of change of demand could be determined in a similar manner to how the rate at which the operator input device was advanced from the first position to the second position was determined, as described herein above. In the event that the operator demand is not input via a physically movable input device, the control module 42 may be programmed with an algorithm that determines or sets an acceleration rate of the demand, whether the demand be for a vessel speed or an engine speed, based on the operator inputs. Alternatively, the operator may directly input the acceleration rate at which the operator would like to launch using one or more of the operator input devices. In response to the rate of change of demand exceeding a predetermined rate, the control module 42 utilizes a successively measured operating speed of the propulsion system 36 and an offset trim profile 600 or 602 relating operating speed to trim position to determine a corresponding setpoint trim position for the propulsion device 10, as shown at 1004. The method also includes controlling the trim actuator 28 to rotate the propulsion device 10 to the setpoint trim position corresponding to the measured operating speed as the measured operating speed of the propulsion system 36 increases from the initial operating speed to the subsequent operating speed, as shown at 1006. Utilizing rate of change of demand can allow the algorithm to be initiated when a vessel 30 with a large speed range accelerates from a relatively low speed that is, however, not near idle, to a very high, on-plane speed.

Not only may the rate of change of demand be required to be greater than or equal to a predetermined rate, but the initial and subsequent operator demands may also be required to meet certain criteria before a hole shot is flagged. For example, the method may also include utilizing the offset trim profile 600 or 602 to determine the setpoint trim position in response to the rate of change of demand exceeding the predetermined rate and the subsequent operator demand exceeding a predetermined demand upper threshold. This ensures that the final requested speed is one at which the vessel will be on-plane. The method may also include utilizing the offset trim profile 600 or 602 to determine the setpoint trim position in response to the rate of change of demand exceeding the predetermined rate, the subsequent operator demand exceeding the predetermined demand upper threshold, and the initial operator demand being less than a predetermined demand lower threshold. This ensures that the vessel is accelerating from at or near a dead-stop or very slow speed to a higher, near maximum speed. Similar to the example described above, the demand upper threshold can be about 90% of a maximum forward demand, and the demand lower threshold can be about 10% of the maximum forward demand.

As described herein above with respect to FIG. 6, the propulsion system operating speed at which the propulsion device 10 begins trimming up from a minimum trim position is less according to the offset trim profile 600 or 602 than according to the base trim profile 604 relating operating speed to trim position, which is utilized to determine the setpoint trim position when the rate of change of demand does not exceed the predetermined rate. Except for a maximum trim position 606, a trim position related to a given operating speed is greater according to the offset trim profile 600 or 602 than according to the base trim profile 604. The maximum trim position 606 is identical according to both the base trim profile 604 and the offset trim profile(s) 600, 602. In response to determining that the propulsion device 10 is at the maximum trim position 606, the method further includes determining the setpoint trim position from the base trim profile 604 in response to subsequent changes in the measured operating speed of the propulsion system 36.

The method may further include determining an offset amount between the propulsion system operating speed at which the propulsion device 10 begins trimming up from the minimum trim position (e.g., NT or 0%) according to the offset trim profile 600 or 602 and according to the base trim profile 604. In one example, the offset amount is directly related to the rate of change of demand. In other words, as rate of change of demand increases, the offset amount also increases. This could be accomplished by modifying the output from the base trim profile 604 by an equation whose inputs include the rate of change of demand. In other examples, thresholds could be used to shift to a more aggressive offset trim profile each time the rate of change of demand increases by a given increment.

The method may also include determining an offset amount between the propulsion system operating speed at which the propulsion device 10 begins trimming up from the minimum trim position (e.g., NT or 0%) according to the offset trim profile 600 or 602 and according to the base trim profile 604, wherein the offset amount is determined from an input-output map saved in the memory 40 of the control module 42 and is based on at least one of a type of the marine vessel 30, a type of the marine propulsion device 10, and a type of the trim actuator 28. This example was described herein above.

The measured operating speed of the propulsion system 36 may be a measured speed of the vessel 30, and the method may further comprise utilizing the offset trim profile 600 or 602 to determine the setpoint trim position in response to the rate of change of demand exceeding the predetermined rate and in response to an initial measured vessel speed corresponding to the initial operator demand being less than a predetermined vessel speed. While using the offset trim profile 600 or 602 to determine the setpoint trim position, the method may further include utilizing the base trim profile 604 to determine the setpoint trim position in response to determining that the measured vessel speed is no longer increasing. As described herein above, in theses types of circumstances, the aggressive trim provided by the offset trim profiles 600 and 602 is no longer required.

Making sure that a hole shot is requested before shifting to using the offset trim profile 600 or 602 will prevent undesired behavior of the vessel 30 under most circumstances. The more aggressive offset trim profiles 600 and 602 would cause bow lift and porpoising during normal driving; however, the high acceleration experienced during a hole shot will result in passing though these regions relatively quickly, and giving the trim system a head start during the hole shot should not result in any undesired vessel behavior. During a hole shot, unlike during normal driving, it can be beneficial to begin trimming the propulsion device 10 out as soon as the vessel 30 has rolled over on plane, or even sooner depending on how fast the vessel 30 is and how slow the trim system is. The present method is used to detect hole shot and to begin auto-trimming the propulsion device 10 at a lower vessel or engine speed than the standard (base) trim profile calls for.

Detection of hole shot and automatic shifting on the part of the control module 42 to using the offset trim profile 600 or 602 can help alleviate the loss of launch efficiency incurred when a slow trim system lags behind a quickly accelerating vessel. For example, even when an operator manually trims a propulsion device 10 by continuously pressing the trim up button 70a on the keypad 66, slower trim systems will still lag faster vessel accelerations. Having the control module 42 automatically trim the propulsion device 10 up in response to detecting a hole shot is therefore more efficient and effective than manually trimming up when accelerating quickly onto plane. The operator does not having to worry about over trimming and blowing out, because the calibrated setpoint trim positions in the offset trim profiles will prevent this from occurring. The operator can also concentrate on driving rather than trimming, which is helpful especially when the vessel is a faster bass boat or a racing application, which are harder to control and might require two hands on the steering wheel 44 at times. Additionally, the automated trim algorithm is much more repeatable in terms of achieving desired results than is manually trimming while initiating a hole shot launch.

In the above description, certain terms have been used for brevity, clarity, and understanding. No unnecessary limitations are to be inferred therefrom beyond the requirement of the prior art because such terms are used for descriptive purposes and are intended to be broadly construed. The different systems and method steps described herein may be used alone or in combination with other systems and methods. It is to be expected that various equivalents, alternatives and modifications are possible within the scope of the appended claims. Each limitation in the appended claims is intended to invoke interpretation under 35 U.S.C. § 112(f), only if the terms "means for" or "step for" are explicitly recited in the respective limitation.

What is claimed is:

1. A method for automatically controlling a trim position of a trimmable marine propulsion device with respect to a marine vessel, the propulsion device being powered by a propulsion system, the method being carried out by a control module and comprising:
   operating the propulsion system at an initial operating speed associated with a first position of an operator input device;
   in response to determining that the operator input device has been advanced to a second position, operating the propulsion system at a subsequent operating speed that is greater than the initial operating speed;
   determining a rate at which the operator input device was advanced from the first position to the second position;
   in response to each of the following conditions being true, utilizing a successively measured operating speed of the propulsion system and an offset trim profile relating operating speed to trim position to determine a corresponding setpoint trim position for the propulsion device:
   (a) the first position of the operator input device is less than a predetermined first threshold;

(b) the second position of the operator input device is greater than or equal to a predetermined second threshold that is higher than the first threshold; and (c) the rate is greater than or equal to a predetermined rate; and as the measured operating speed of the propulsion system increases from the initial operating speed to the subsequent operating speed, controlling a trim actuator to rotate the propulsion device to the setpoint trim position corresponding to the measured operating speed;

wherein a propulsion system operating speed at which the propulsion device begins trimming up from a minimum trim position is less according to the offset trim profile than according to a base trim profile relating operating speed to trim position, where the base trim profile is utilized to determine the setpoint trim position when at least one of conditions (a), (b), and (c) is not true.

2. The method of claim 1, wherein, except for a maximum trim position, a trim position related to a given operating speed is greater according to the offset trim profile than according to the base trim profile.

3. The method of claim 2, wherein the maximum trim position is identical according to both the base trim profile and the offset trim profile.

4. The method of claim 2, wherein in response to determining that the propulsion device is at the maximum trim position, the method further includes determining the setpoint trim position from the base trim profile in response to subsequent changes in the measured operating speed of the propulsion system.

5. The method of claim 1, wherein the first threshold corresponds to a propulsion system operating speed at which the vessel is not on-plane, and the second threshold corresponds to a propulsion system operating speed at which the vessel is on-plane.

6. The method of claim 5, wherein the first threshold is ten percent of a maximum position of the operator input device and the second threshold is ninety percent of the maximum position.

7. The method of claim 6, wherein the predetermined rate is between forty percent of the maximum position per second to fifty percent of the maximum position per second.

8. The method of claim 1, wherein the measured operating speed of the propulsion system is a measured speed of the vessel, and further comprising:

utilizing the offset trim profile to determine the setpoint trim position in response to conditions (a), (b), and (c) being true, and in response to a first measured vessel speed associated with the first position of the operator input device being less than a predetermined vessel speed.

9. The method of claim 8, wherein while using the offset trim profile to determine the setpoint trim position, the method further comprises:

utilizing the base trim profile to determine the setpoint trim position in response to determining that the measured vessel speed is no longer increasing.

10. The method of claim 1, wherein while utilizing the offset trim profile to determine the setpoint trim position, the method further comprises:

in response to determining that the operator input device has been retracted to a third position, operating the propulsion system at a new operating speed that is less than the subsequent operating speed; and utilizing the base trim profile to determine the setpoint trim position.

11. A method for automatically controlling a trim position of a trimmable marine propulsion device with respect to a marine vessel, the propulsion device being powered by a propulsion system, the method being carried out by a control module and comprising:

receiving operator demands corresponding to operating speeds of the propulsion system;

determining a rate of change of demand versus time between an initial operator demand corresponding to an initial operating speed and a subsequent operator demand corresponding to a subsequent operating speed that is greater than the initial operating speed;

in response to the rate of change of demand exceeding a predetermined rate, utilizing a successively measured operating speed of the propulsion system and an offset trim profile relating operating speed to trim position to determine a corresponding setpoint trim position for the propulsion device; and as the measured operating speed of the propulsion system increases from the initial operating speed to the subsequent operating speed, controlling a trim actuator to rotate the propulsion device to the setpoint trim position corresponding to the measured operating speed;

wherein a propulsion system operating speed at which the propulsion device begins trimming up from a minimum trim position is less according to the offset trim profile than according to a base trim profile relating operating speed to trim position, where the base trim profile is utilized to determine the setpoint trim position when the rate of change of demand does not exceed the predetermined rate.

12. The method of claim 11, wherein, except for a maximum trim position, a trim position related to a given operating speed is greater according to the offset trim profile than according to the base trim profile.

13. The method of claim 12, wherein the maximum trim position is identical according to both the base trim profile and the offset trim profile.

14. The method of claim 12, wherein in response to determining that the propulsion device is at the maximum trim position, the method further includes determining the setpoint trim position from the base trim profile in response to subsequent changes in the measured operating speed of the propulsion system.

15. The method of claim 12, further comprising determining an offset amount between the propulsion system operating speed at which the propulsion device begins trimming up from the minimum trim position according to the offset trim profile and according to the base trim profile;

wherein the offset amount is directly related to the rate of change of demand.

16. The method of claim 12, further comprising determining an offset amount between the propulsion system operating speed at which the propulsion device begins trimming up from the minimum trim position according to the offset trim profile and according to the base trim profile;

wherein the offset amount is determined from an input-output map saved in a memory of the control module and is based on at least one of a type of the vessel, a type of the propulsion device, and a type of the trim actuator.

17. The method of claim 11, wherein the measured operating speed of the propulsion system is a measured speed of the vessel, and further comprising:

utilizing the offset trim profile to determine the setpoint trim position in response to the rate of change of demand exceeding the predetermined rate and in response to an initial measured vessel speed corresponding to the initial operator demand being less than a predetermined vessel speed.

18. The method of claim 17, wherein while using the offset trim profile to determine the setpoint trim position, the method further comprises:

utilizing the base trim profile to determine the setpoint trim position in response to determining that the measured vessel speed is no longer increasing.

19. The method of claim 11, further comprising utilizing the offset trim profile to determine the setpoint trim position in response to the rate of change of demand exceeding the predetermined rate and the subsequent operator demand exceeding a predetermined demand upper threshold.

20. The method of claim 19, further comprising utilizing the offset trim profile to determine the setpoint trim position in response to the rate of change of demand exceeding the predetermined rate, the subsequent operator demand exceeding the predetermined demand upper threshold, and the initial operator demand being less than a predetermined demand lower threshold.

* * * * *